United States Patent
Zhou et al.

(10) Patent No.: US 9,958,768 B2
(45) Date of Patent: May 1, 2018

(54) DISPLAY DEVICE

(71) Applicant: YUTOU TECHNOLOGY (HANGZHOU) CO., LTD., Hangzhou, Zhejiang (CN)

(72) Inventors: Yongjun Zhou, Hangzhou (CN); Da Wei, Hangzhou (CN)

(73) Assignee: YUTOU TECHNOLOGY (HANGZHOU) CO., LTD. (CN)

( * ) Notice: Subject to any disclaimer, the term of this patent is extended or adjusted under 35 U.S.C. 154(b) by 0 days. days.

(21) Appl. No.: 14/764,172

(22) PCT Filed: Jun. 12, 2015

(86) PCT No.: PCT/CN2015/081396
§ 371 (c)(1),
(2) Date: Jul. 29, 2015

(87) PCT Pub. No.: WO2016/112627
PCT Pub. Date: Jul. 21, 2016

(65) Prior Publication Data
US 2017/0315391 A1    Nov. 2, 2017

(30) Foreign Application Priority Data
Jan. 12, 2015 (CN) .......................... 2015 1 0014573

(51) Int. Cl.
*G03B 21/62* (2014.01)
*G02F 1/1347* (2006.01)
(Continued)

(52) U.S. Cl.
CPC ............... *G03B 21/62* (2013.01); *G02F 1/01* (2013.01); *G02F 1/0311* (2013.01);
(Continued)

(58) Field of Classification Search
CPC ................................ G03B 21/60; G03B 21/62
(Continued)

(56) References Cited

U.S. PATENT DOCUMENTS 3,205,771 A * 9/1965 Harrison ............... G03B 21/20
312/10.1
5,510,862 A * 4/1996 Lieberman ............ G03B 21/10
353/119
(Continued)

FOREIGN PATENT DOCUMENTS

CN 101266398 A 9/2008
CN 101859054 A 10/2010
(Continued)

OTHER PUBLICATIONS

PCT/CN2015/081396, Written opinion of the international searching authority, dated Oct. 29, 2015.

*Primary Examiner* — Christopher Mahoney
(74) *Attorney, Agent, or Firm* — Steven M. Greenberg; CRGO Law

(57) ABSTRACT

The present invention provides for a display device, which is applied to rear projection system. The device includes a screen, which is curved with incident rays penetrating into a concave side of the screen, and then being transmitted by the screen, to form parallel rays to be emitted out from the convex side of the screen. The device also includes a projecting unit, configured to project rays of an image to the screen, the image including a valid area and an invalid area. The device yet further includes a covering plank, located between the screen and the projecting unit, and configured to cover the invalid area of the image for getting the light of the valid area of the image emitted by the projecting unit to project to the screen.

4 Claims, 6 Drawing Sheets

(51) Int. Cl.
*G02F 1/03* (2006.01)
*G02F 1/01* (2006.01)
*G03B 21/20* (2006.01)

(52) U.S. Cl.
CPC ......... *G02F 1/1347* (2013.01); *G03B 21/208* (2013.01); *G02F 1/0147* (2013.01)

(58) Field of Classification Search
USPC .......................................... 359/450–451, 460
See application file for complete search history.

(56) References Cited

U.S. PATENT DOCUMENTS

| | | | | |
|---|---|---|---|---|
| 5,796,443 | A * | 8/1998 | Kawajiri | H04N 5/64 348/789 |
| 8,300,311 | B2 * | 10/2012 | Jelusic | A47B 37/02 359/451 |
| 2006/0092338 | A1 * | 5/2006 | Sakai | H04N 5/7408 348/744 |
| 2007/0090308 | A1 * | 4/2007 | Harding | G01B 11/254 250/559.42 |
| 2011/0069286 | A1 * | 3/2011 | Itoh | H04N 9/3141 353/119 |
| 2011/0075114 | A1 * | 3/2011 | Tanis-Likkel | G03B 21/26 353/97 |

FOREIGN PATENT DOCUMENTS

| | | |
|---|---|---|
| CN | 203965785 U | 11/2014 |
| JP | 2012159646 A * | 8/2012 |

\* cited by examiner

DISPLAY DEVICE

CROSS-REFERENCE TO RELATED APPLICATIONS

This application is a Submission Under 35 U.S.C. § 371 for U.S. National Stage Patent Application of International Application Number PCT/CN2015/081396, filed Jun. 12, 2015, and entitled A DISPLAY DEVICE, which is related to and claims priority to Chinese Patent Application Serial Number 201510014573.4, filed Jan. 12, 2015, the entirety of both are incorporated herein by reference.

BACKGROUND OF THE INVENTION

Field of the Invention

The present invention relates to the field of optics, and more specifically, to a curved display device.

Description of the Related Art

The existing rear projection screen is usually a flat screen. As such, the distance from the screen to a viewer's left eye is different from the distance from the screen to the viewer's right eye. Therefore, problems such as no ideal effect, getting visual fatigue easily and poor visual effect always exist. Furthermore, as shown in FIG. 1, there are other problems concerning the light spot ghost shadow 6 of the projection light source, the scattered beam 5 which is the projected light beam, and the fuzzy borders around the projected image.

SUMMARY OF THE INVENTION

In order to solve the problems of the existing rear projection screen, as are described above, the invention provides a display device, with the specific purpose of eliminating the light spot ghost shadow and the fuzzy borders, and of promoting a quality viewing experience for viewers.

The technical solution of the invention is a display device, applied to a rear projection system. The device includes a screen, which is curved such that incident rays penetrate into a concave side of the screen, and are then transmitted by the screen so as to form parallel rays to be emitted out from the convex side of the screen. The system also includes a projecting unit configured to project rays of an image to the screen so that the image includes a valid area and an invalid area. The system yet further includes a cover, located between the screen and the projecting unit that is configured to cover the invalid area of the image for getting the light of the valid area of the image emitted by the projecting unit to project to the screen.

In one aspect of the embodiment, the screen is made from translucent resin. In another aspect of the embodiment, the projecting unit is a silicon based liquid crystal projecting unit or a digital light procession projecting unit. In yet another aspect of the embodiment, there are more than one of the covers, and the covers are arranged between the projecting unit and the screen in parallel and in sequence, with an orientation along a direction of emitting the light of the image emitted by the projecting unit, for covering the invalid area of the image. Optionally, center areas of the covers are hollow areas, and the covers with an increasing size of the hollow areas in sequence, are positioned between the projecting unit and the screen equidistantly for eliminating the invalid area of the image. In another aspect of the embodiment, the projecting unit includes a receiver module, for receiving projected images. As well, the unit includes a projector module connecting to the receiver module and configured to project lights of the projected images to the screen.

BRIEF DESCRIPTIONS OF THE DRAWINGS

DETAILED DESCRIPTIONS

Figure 2:
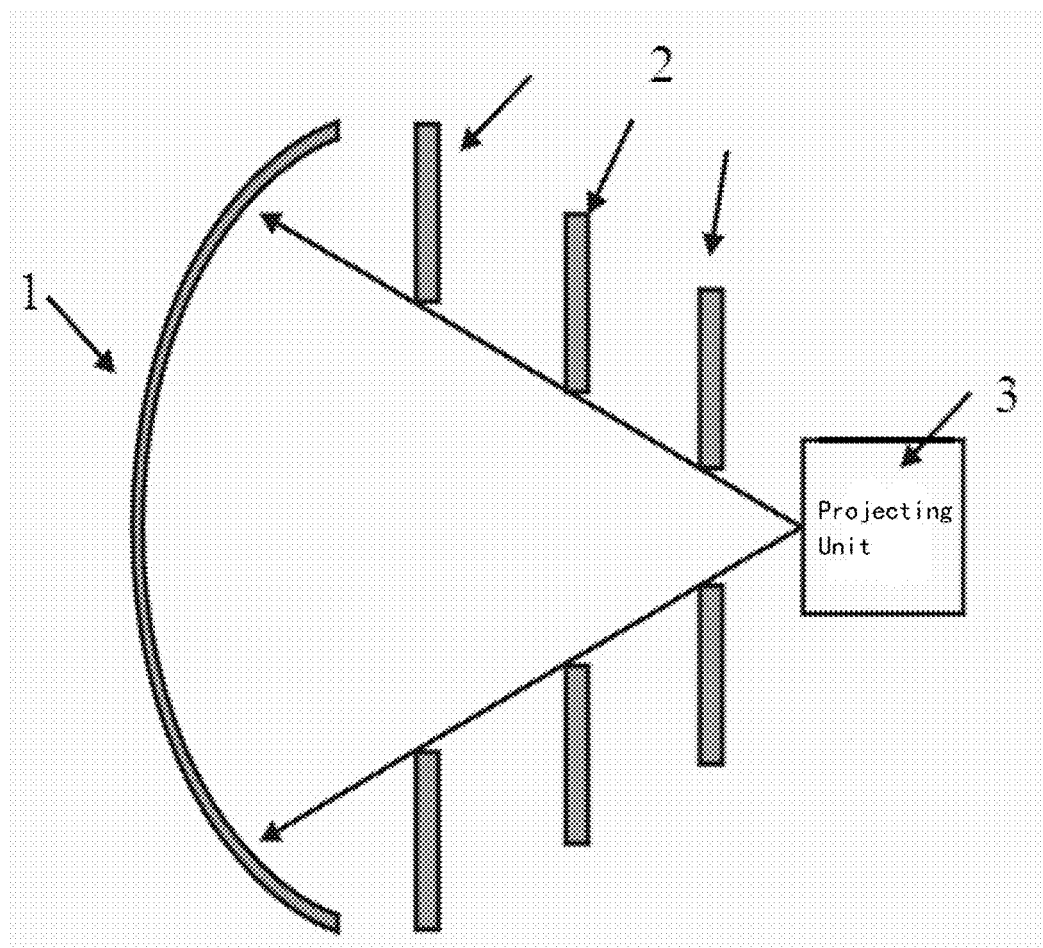
FIG. 2 is a structural schematic drawing of a display device of an embodiment according to the invention.
Figure 3:
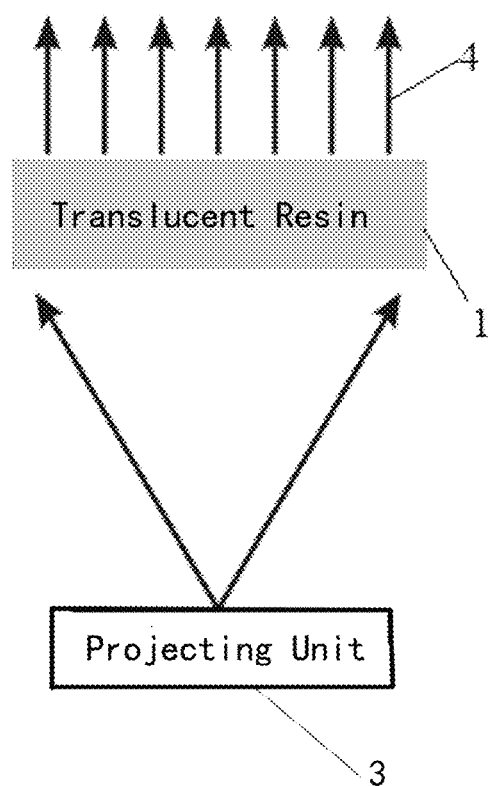
FIG. 3 is a schematic drawing of rays casting of a screen made from translucent resin of an embodiment according to the invention.

As shown in FIG. 2-4, a display device, applied to the rear projection system, includes: a screen 1, a cover 2 and a projecting unit 3, wherein the screen 1 is curved, configured to make incident rays penetrate into the concave side of the screen 1 and to then transmit from the convex side of the screen 1, projecting out in the form of parallel rays 4; the projecting unit 3 is configured to project rays of an image to the screen 1, and the image includes a valid area A and an invalid area B; the cover 2 is located between the screen 1 and the projecting unit 3, configured to cover the invalid area B of the image for getting the light of the valid area A of the image emitted by the projecting unit 3 to project to the screen 1.

Figure 1:
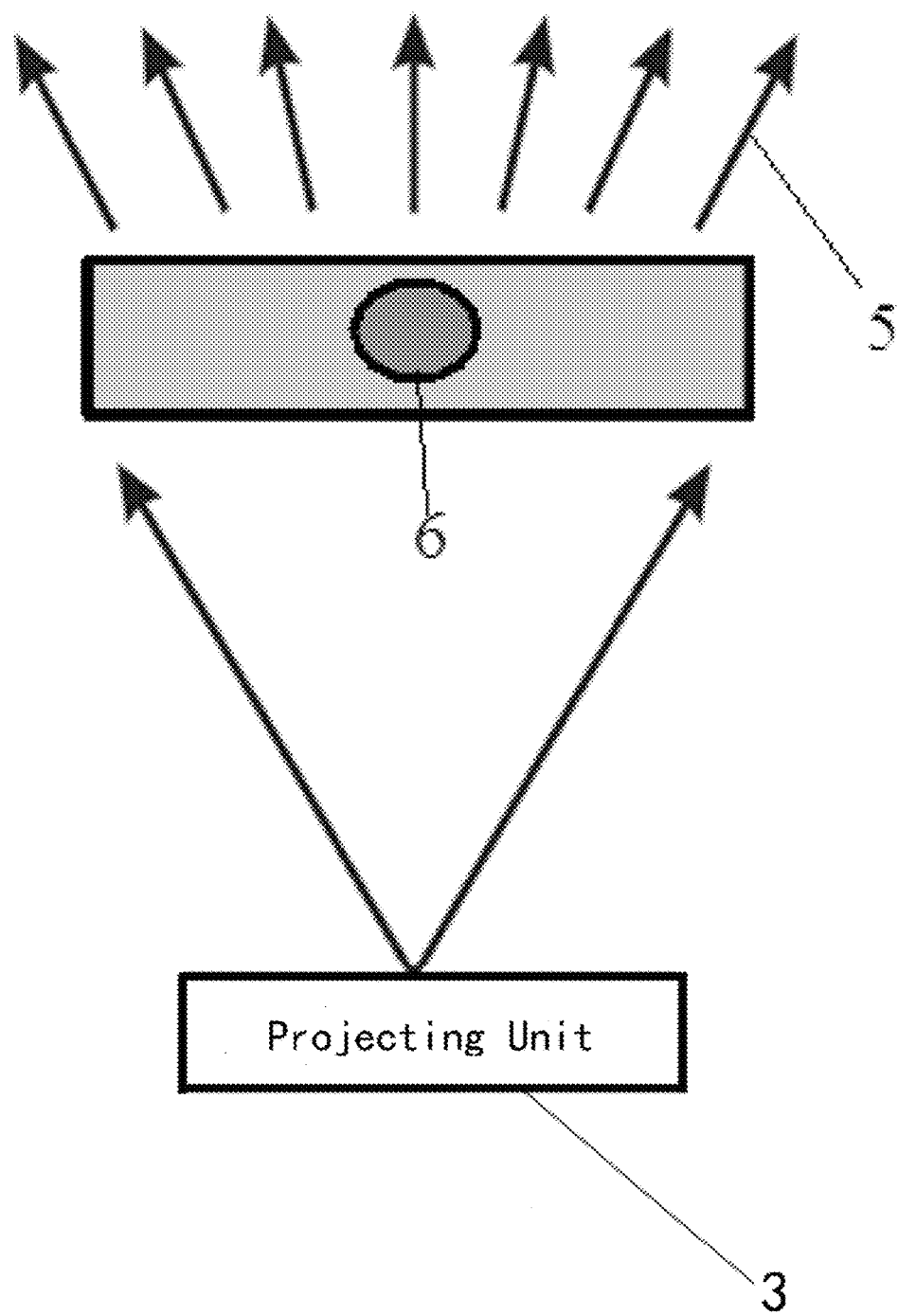
FIG. 1 is a diagrammatic drawing of light spot ghost shadow of a projection light source of a rear projection screen in the art.

In this embodiment, the display device is applied to the rear projection system, which eliminates the fuzzy borders of projected images with the use of the cover 2, this not only improves the contrast of projected images, but also eliminates the light spot ghost shadow 6 (see FIG. 1 and FIG. 3), with the use of the screen 1, which is able to let incident rays penetrate through itself and form parallel rays 4, increasing the utilization rate of light source. Moreover, the use of the curved screen 1 highlights the layering of images, thus promoting sensual experience of viewers.

In a preferable embodiment, the screen 1 is made from translucent resin. Furthermore, the screen 1 can use curved Fresnel lens whose surface is covered by a semi-transparent layer. Fresnel lens is a sheet lens which is made from polyolefin resin using injection molding, one side of its lens surface is a mirror side, the other side of that is engraved with concentric circles placed in sequence from small to large, which is able to let incident rays penetrate through the lens and emit out parallel rays, thus improving the contrast of images, more uniformly, and eliminating the light spot ghost shadow of projected images.

In a preferred embodiment, the projecting unit 3 is a silicon based liquid crystal projecting unit or a digital light procession projecting unit.

Liquid Crystal on Silicon (LCOS) uses a reflex process to form images, with 40% of utilization efficiency. Compared with other projection technology, a remarkable advantage of LCOS technology is high resolution, and projecting units with LCOS technology have further advantages such as high efficiency of the light utilization, small size, high aperture ratio and so on.

Digital Light Procession (DLP) has a technology core based on a digital microscope system consisting of tens of thousands of lenses, with a distance of less than 1 μm between each lens, thereby achieving extremely high-duty factor. Reducing the distance among pixels of the projected images to the limit could generate seamless digital pictures, which can keep good image sharpness at any size, without any pixel scar or sieve pore caused by other technologies, thus achieving the level of high-definition LCD in displayed images. DLP projecting technology can promote black layer and shadow effect. When a movie is played, DLP movie theatre technology can display 350 trillion colors, which are more than 8 times over the movie.

In a preferable embodiment, there are more than one of the covers 2, a number of the covers are arranged between the projecting unit 3 and the screen 1 in parallel and in sequence, with an orientation along a direction of emitting light of the image emitted by the projecting unit 3, for covering the invalid area B of the projected image.

Figure 4A:
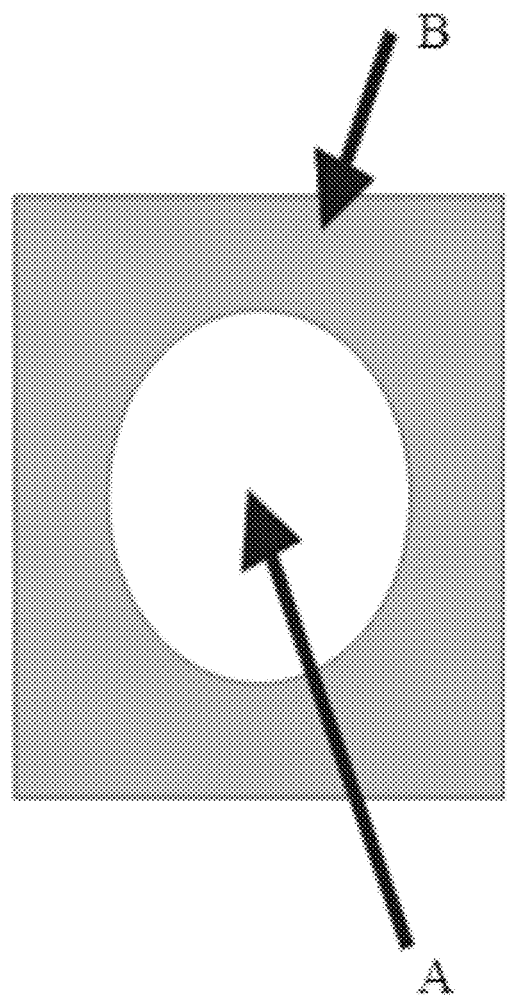
FIG. 4a is a frame schematic drawing of the elliptical valid area of projected image of an embodiment according to the invention.
Figure 4B:
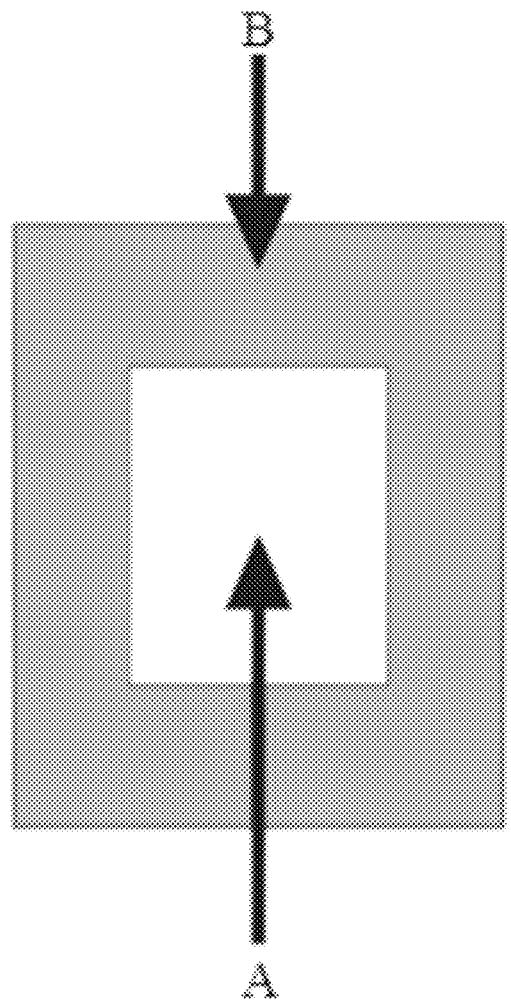
FIG. 4b is a frame schematic drawing of the rectangular valid area of a projected image of an embodiment according to the invention.
Figure 4C:
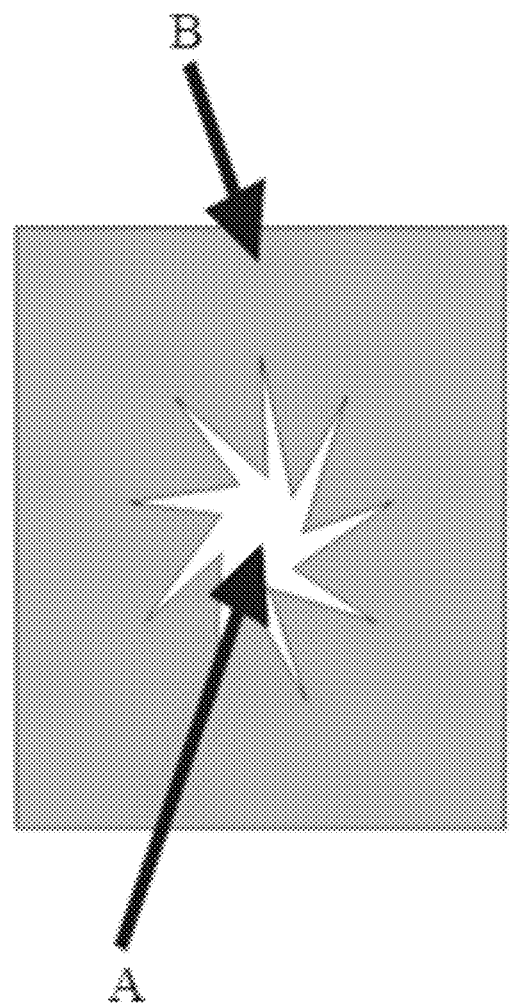
FIG. 4c is a frame schematic drawing of the polygonal valid area of a projected image of an embodiment according to the invention.

As shown in FIGS. 3-4, in a preferable embodiment, center areas of the covers 2 are hollow areas, and the plurality of covers with increasing size of hollow areas in sequence, positioned between the projecting unit 3 and the screen 1 equidistantly for eliminating the invalid area B (fuzzy borders) of the projected image, thus displaying the valid area A, which is elliptical, rectangular, polygonal (see FIG. 4a-4c) or in other shapes.

In a preferable embodiment, the projecting unit 3 comprises: a receiver module and a projector module, wherein the receiver module is configured to receive projected images; wherein the projector module, connected to the receiver module, is configured to project lights of the projected images to the screen 1.

When it is used, a video interface could be set in the projecting unit 3, such as HDMI, MIPI or RGB interface, and the projecting unit 3 is connected with an external control chip through the video interface. When the video interface of the projecting unit 3 have been connected with that of the control chip, the projecting unit 3 can receive video signals transmitted by the control chip, and with the use of the cover 2, the projecting unit 3 can project the valid area A of the received image to the curved screen 1 made from resin material, finally displaying the valid area A of the image on the curved screen 1 of a robot.

The above description is referred only to the preferred embodiments of the invention, and it does not limit the implement method and the protecting scope of the invention. It is obvious for the skilled in the art that the changing and variation made by the specification and drawings of the invention should fall into the scope of the invention.

What is claimed is:

1. A display device, applied to a rear projection system, comprising:
    a screen, which is curved, the screen permitting incident rays to penetrate into a concave side of the screen, and then be transmitted by the screen, and form parallel rays to be emitted out from a convex side of the screen, the screen having a curved Fresnel lens with a surface that is covered by a semi-transparent layer;
    a projecting unit, configured to project rays of an image to the screen, the image including a valid area and an invalid area; and,
    a multiplicity of covering planks, each of the covering planks being located between the screen and the projecting unit in parallel and in sequence with an orientation along a direction of emitting light of the image emitted by the projecting unit for covering the invalid area of the image, the plank being configured to cover the invalid area of the image so as to permit the light of the valid area of the image to be emitted by the projecting unit to project onto the screen;
    wherein a center area of each of the covering planks is a hollow area, and
    wherein the covering planks are positioned in sequence according to an increasing size of the hollow areas and are positioned between the projecting unit and the screen equidistantly so as to eliminate the invalid area of the image.

2. The display device as claimed in claim 1, wherein the screen is made from translucent resin.

3. The display device as claimed in claim 1, wherein the projecting unit is a silicon based liquid crystal projecting unit or a digital light procession projecting unit.

4. The display device as claimed in claim 1, wherein the projecting unit comprises:
    a receiver module, for receiving projected images; and,
    a projector module, connecting to the receiver module, and configured to project lights of the projected images to the screen.

\* \* \* \* \*